United States Patent Office 3,540,936
Patented Nov. 17, 1970

3,540,936
LEAD ADDITIVE FOR RECHARGEABLE BATTERIES EMPLOYING AN ORGANIC DEPOLARIZER
Alvin J. Salkind, Princeton, N.J., assignor to ESB Incorporated, a corporation of Delaware
No Drawing. Filed Nov. 1, 1968, Ser. No. 772,826
Int. Cl. H01m 15/00, 39/04
U.S. Cl. 136—137                    8 Claims

ABSTRACT OF THE DISCLOSURE

An electric battery having an azodicarbonamide compound as the depolarizer in which a lead salt is added to the cathode (depolarizer) mix to improve the battery cycle life. The lead additive may be dry blended with the depolarizer or dissolved in the electrolyte which is mixed with the dry cathode mix. The lead salt is added to the cathode mix in amounts ranging from about 0.0001 to about 0.1 gram of lead per square inch of anode surface surrounding the cathode. The lead salt is effective for both substituted and unsubstituted azodicarbonamide battery depolarizers.

---

In the electric battery art, both primary and secondary cells have achieved substantial commercial success. Primary cells are electrochemical devices in which the chemical reaction for converting chemical energy into electrical energy is not reversible, i.e. it is not practical to reverse the reaction by recharging the cell with electrical energy. Secondary cells convert chemical energy into electrical energy by reversible chemical reactions and are generally recharged repeatedly by applying electrical energy to the discharged cell to reconvert the reaction products into their charged state.

Primary and secondary cells generally comprise a negative electrode (anode), a positive electrode (cathode), a separator between said electrodes, and an electrolyte. The negative electrode is usually made of a metal such as zinc, magnesium, aluminum, cadmium, lead, etc., and alloys thereof, and positive electrodes are inorganic or organic oxidizing agents which may also contain a conductive material such as carbon. The positive electrode is commonly referred to as a cathode (depolarizer) mix and many compounds which are readily reducible and have high oxidizing potentials have been tried as depolarizers.

In the standard flashlight battery, also known as the LeClanche cell, the negative electrode is a zinc can which also functions as the cell container, the cathode mix is manganese dioxide mixed with a conductive carbon and the ammonium chloride-zinc chloride electrolyte solution, and paper, a paste of starch and flour, or other gelling agents may be used as the separator. There have been many attempts to develop depolarizers for both primary and secondary cells which have improved shelf-life, rechargeability, particularly after deep discharge, and useful voltages.

U.S. Pat. No. 3,357,865 which issued to Stanley M. Davis, Charlotte M. Kraebel and Richard A. Parent on Dec. 12, 1967 discloses that substituted azodicarbonamide compounds have been found to be effective depolarizer materials for both primary and secondary cells. Azodicarbonamide compounds, both substituted and unsubstituted, are particularly useful depolarizers for they are readily recharged after relatively deep discharges. Initial attempts to use azodicarbonamide compounds as depolarizers in cells having a standard LeClanche dry cell construction, with the azodicarbonamide compound substituted for the manganese dioxide depolarizer, resulted in cells having poor cycle life and cells which lost substantial capacity during storage, particularly storage at high temperatures.

SUMMARY OF THE INVENTION

It is the general purpose of this invention to provide an additive for an electric battery employing an organic depolarizer of the azodicarbonamide type which improves battery cycle life and storage life particularly during high temperature storage. The additives found to be effective in accordance with this invention are soluble lead salts, particularly lead chloride and lead chromate, which are incorporated into the cathode (depolarizer) mix by dissolving the additive in the electrolyte prior to adding the electrolyte to the cahode mix, or by dry blending it with the cathode mix ingredients prior to adding the electrolyte. It has been found that the lead addiives when incorporated into the organic depolarizer in amounts rnaging from abotu 0.0001 to about 0.1 gram of lead per square inch of anode surface surrounding the cathode substantially improve the cycle life and storage life of cells employing an azodicarbonamide type depolarizer.

DESCRIPTION OF THE PREFERRED EMBODIMENT

The lead additives of this invention are useful in both primary and secondary batteries which employ an azodicarbonamide compound as the depolarizer. Both substituted (U.S. Pat. No. 3,357,865) and unsubstituted azodicarbonamide materials are useful as depolarizers in electric batteries, and these azodicarbonamide depolarizers may be generally represented by the following formula:

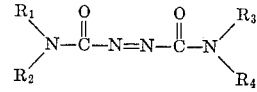

where $R_1$, $R_2$, $R_3$ and $R_4$ may be hydrogen, alkyl of 1 to 8 carbon atoms, mono- and dicarbocyclic aryl or substituted aryl, cycloalkyl, aralkyl, alkoxyalkyl, cyanoalkyl, haloalkyl, nitroalkyl, alkenyl, and where $R_1$ and $R_2$ and/or $R_3$ and $R_4$ when alkyl may be joined together through a nitrogen, sulfur or oxygen linkage to form a heterocyclic ring. Unsubstituted azodicarbonamide, when $R_1$, $R_2$, $R_3$ and $R_4$ are all hydrogen, is also useful as a depolarizer material in accordance with this invention, when used either alone or in combination with substituted azodicarbonamide compounds. The preferred azodicarbonamide compounds are those in which the nitrogen atoms carry an alkyl radical of 1 to 4 carbon atoms. As disclosed in U.S. Pat. No. 3,357,865, it is possible to use the corresponding substituted or unsubstituted biurea and oxidize it by charging the cell in the presence of an appropriate catalyst, thereby forming an azodicarbonamide compound in situ in the cell. Furthermore, mixtures of the azodicarbonamide compounds may be used as depolarizers as well as the compounds individually.

The azodicarbonamide compounds are present in the cathode mix in amounts ranging from about 10 to about 60% by weight of the total wet mix. The cathode mix also contains electrolyte solution and highly conductive carbon, such as graphite, acetylene black or other high surface area carbon blacks.

The electrolyte solution generally comprises an aqueous solution containing a soluble salt, such as halide salts or mixtures thereof. The cations of these salts may comprise an ammonium radical or metallic ions such as zinc, manganese, etc. It is preferred to use a conventional LeClanche electrolyte which comprises an aqueous solution of ammonium chloride and zinc chloride. For best results, certain electrolyte concentrations may be preferred depending upon the particular salt and the battery use requirements. In general, an electrolyte solution containing standard LeClanche electrolyte ingredients (zinc chloride and ammonium chloride) has been found suitable. For example, one liter of electrolyte may be prepared by dissolving 207 grams of zinc chloride and 329 grams of ammonium chloride in 63 grams of distilled water.

The anode active material may be selected from metals such as zinc, magnesium, aluminum or other electropositive metal, including mixtures or alloys thereof. Zinc or zinc alloys are generally the preferred anode metals, and these may be used as cans or containers in a manner similar to that used in conventional flashlight batteries.

It is preferred to use a laminate separator in which a barrier material, such as cellophane, is laminated to an absorbent material such as kraft paper, starch, flour, carboxymethyl cellulose and other gel forming materials. Particularly outstanding results are achieved using cellophane as the barrier material laminated to an absorbent material comprising a thermoplastic resin (ethylene/vinyl acetate copolymer) as a continuous binder matrix for a gelling agent such as a starch/wheat flour mixture or carboxymethyl cellulose.

In accordance with this invention, the cycle life and the storage characteristics of batteries employing an azodicarbonamide depolarizer material are substantially improved by adding a lead salt to the cathode mix. It is preferred that the lead salt be soluble in the electrolyte used in the battery, and examples of soluble lead salts are lead chloride, lead bromide, lead chromate, lead sulfate, lead acetate and other soluble lead salts whose anions do not adversely affect the battery performance. Though it is generally preferred to use a lead halide corresponding to the halide ions present in the electrolyte, both lead chloride and lead chromate have been found to be very effective in ammonium chloride/zinc chloride electrolyte solution.

The lead additives of this invention may be incorporated into the cathode mix by dry blending with the azodicarbonamide compound and/or the other dry cathode mix ingredients, or alternatively, it may be dissolved in the electrolyte solution or water which is subsequently mixed with the dry cathode mix. Since the preferred lead additives of this invention are soluble in water, it is generally preferred to dissolve the lead salt in water which is later mixed with the dry cathode mix ingredients including the electrolyte salts.

It has been found that the lead additives are effective when incorporated into the azodicarbonamide depolarizer material in amounts ranging from about 0.0001 to about 0.1 gram of lead per square inch of anode surface surrounding the cathode. The amount of lead additive incorporated in the depolarizer material is critical, particularly the maximum. It has been found that excessive amounts of lead additive tend to cause short circuits by forming "lead bridges" upon cycling, and this impairs battery cycle life.

This invention is further described in the following example which illustrates the improvement in cycle life provided by adding lead salts to the depolarizer mix in batteries using azodicarbonamide compounds as depolarizer material.

EXAMPLE I

D size cells using a dibutyl azodicarbonamide depolarizer, a zinc can for the anode, ammonium chloride/zinc chloride aqueous electrolyte and a laminated separator (cellophane/vinyl acetate-ethylene copolymer binder resin for a wheat flour/cornstarch gelling agent mixture) were tested to determine the effect of lead chloride additive upon cycle life. The lead chloride additive was dissolved in the electrolyte and added to the cathode mix.

The cycling regime comprised discharging the cells through a 2.2 ohm load for 2 hours, and charging the cells with 1.62 volts through 2.7 ohms for 22 hours. Failure was defined as the delivery of less than 450 milliampere-hours (50% of cell capacity) when the cell voltage had dropped below 0.8 volts.

The following results were recorded:

| | No. cells | Amount PB, gms./in.$^2$ Zn | Cycles to failure, avg. |
|---|---|---|---|
| Additive: | | | |
| PbCl$_2$ | 2 | 0.0005 | 60 |
| PbCl$_2$ | 3 | 0.001 | 82 |
| PbCl$_2$ | 2 | 0.002 | 42 |
| PbCl$_2$ | 1 | 0.01 | 35 |

The cells having the lead chloride in the cathode mix generally had good cycle life, though the cell having the largest amount of lead per square inch of zinc yielded the smallest number of cycles.

The lead additives of this invention are particularly effective for improving the cycle life, and it is within the scope of this invention to use these lead additives with other inorganic or organic additives which may also improve the properties of batteries employing an azodicarbonamide depolarizer.

Having completely described this invention, what is claimed is:

1. In an electric battery having an anode, a cathode mix comprising an azodicarbonamide compound as the depolarizer, conductive carbon and an aqueous electrolyte solution, and a separator between said anode and cathode, the improvement comprisng incorporating a lead salt in the cathode mix in an amount ranging from about 0.0001 to about 0.1 gram of lead per square inch of anode surface surrounding the cathode whereby the battery has improved cycle life.

2. A battery in accordance with claim 1 in which the lead salt is incorporated into the cathode mix by dry blending it with the azodicarbonamide compound.

3. A battery in accordance with claim 1 in which the lead salt is incorporated into the cathode mix by dissolving it in the electrolyte which is subsequently mixed with the azodicarbonamide compounds.

4. A battery in accordance with claim 1 in which the lead salt is lead chloride.

5. A battery in accordance with claim 1 in which the lead salt is lead chromate.

6. A battery in accordance with claim 1 in which the electrolyte is an aqueous solution of halide salts and the lead salt is a lead halide.

7. A battery in accordance with claim 1 in which the anode is zinc and the lead salt is lead chloride.

8. A battery in accordance with claim 1 in which the anode is zinc, the cathode mix comprises dibutyl azodicarbonamide as the depolarizer, the electrolyte is an aqueous solution of ammonium chloride and zinc chloride, and the lead salt is lead chloride.

References Cited

UNITED STATES PATENTS

| 2,078,143 | 4/1937 | Jumau | 136—137 XR |
| 2,306,927 | 12/1942 | Arsem | 136—137 |
| 2,422,045 | 6/1947 | Ruben. | |
| 2,836,644 | 5/1958 | Morehouse et al. | 136—137 |
| 3,481,792 | 12/1969 | Davis et al. | 136—137 |

WINSTON A. DOUGLAS, Primary Examiner

D. L. WALTON, Assistant Examiner

U.S. Cl. X.R.

136—154, 155